May 4, 1965    F. J. SKRIP    3,181,586
TIRE CHAIN TRACTION DEVICE AND THE LIKE
Filed Jan. 11, 1963
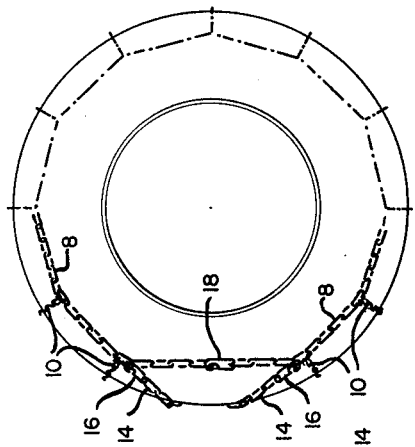
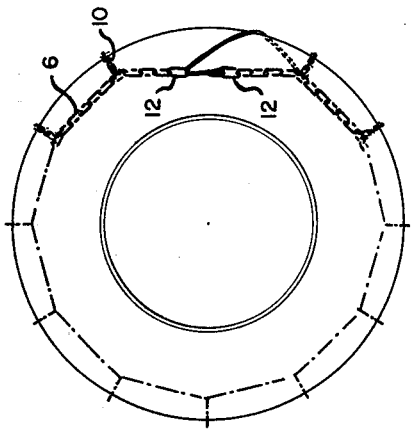
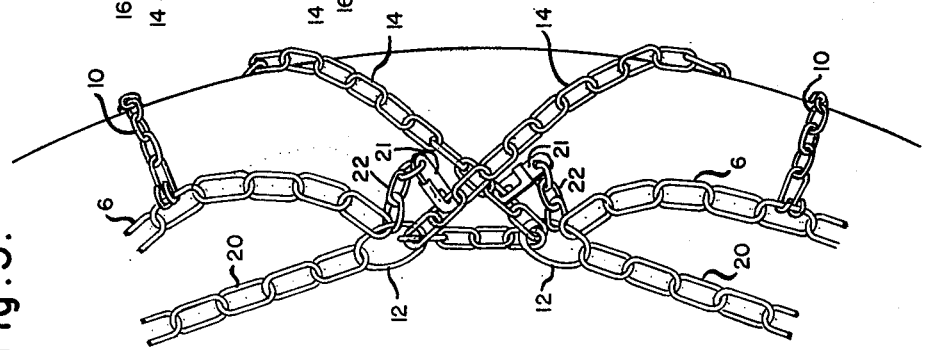
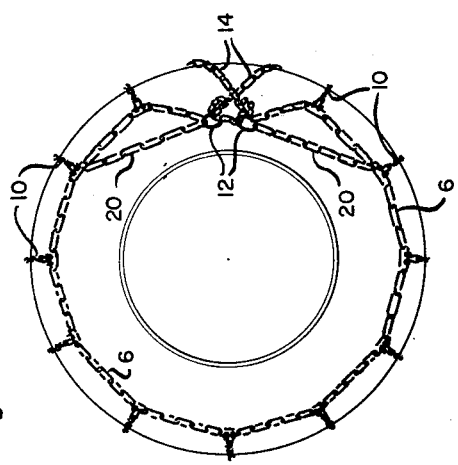
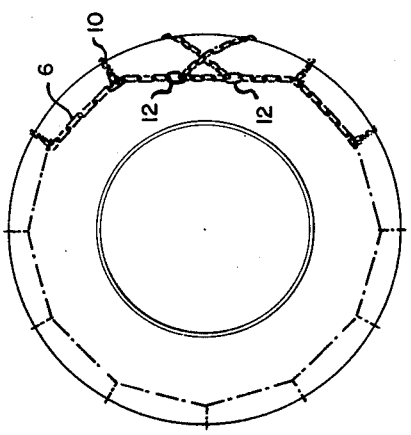
INVENTOR
Frank J. Skrip

United States Patent Office

3,181,586
Patented May 4, 1965

3,181,586
TIRE CHAIN TRACTION DEVICE
AND THE LIKE
Frank J. Skrip, 2247 Wilson Ave., Pittsburgh, Pa.
Filed Jan. 11, 1963, Ser. No. 250,931
7 Claims. (Cl. 152—241)

My invention relates to tire chains and more specifically to an improved tire chain linkage system.

In accordance with the prior art of which I am aware, tire chains have been built comprising two runners which are circumferential chains and which form circular rings generally concentric with the axis of the wheel on which they are mounted. These runners lie along the outside and the inside side walls respectively of the tire of the wheel. Connected between the inside runners and the outside runners are a plurality of cross links which are connected to the runners at spaced intervals around the circumference of the wheel. The cross links cross over the tread of the tire to provide increased traction. The chains are mounted by connecting the ends of the runners of the circumferential chains so as to pull the ends of the circumferential chains sufficiently close together that the circumferential chains cannot slip over the tread area of the tire which is at a larger diameter than the diameter of the circumferential chains when they are mounted. Joining the ends of the runner or ring chain or circumferential chain which is on the inside wall of the tire by reaching over the tire and fastening the ends of the circumferential chain on the inside together is very difficult, cold, dirty and uncomfortable.

One solution to this problem is set forth in my Patent No. 3,042,097 which issued July 3, 1962. In accordance with that patent and the invention described in that patent, the chain is secured by means of leaders at the ends of the inner circumferential chain, which leaders extend crossing each other to the outside of the tire where they are fastened to the outer circumferential runner. I have felt, however, that there might be other solutions to this problem which for some purposes might be better.

It is accordingly an object of my invention to provide an improved tire chain which can be mounted easily by a person from the outside of the wheel.

It is another object of my invention to provide a practical chain fastening apparatus whereby all fastening may be done from the outer side of the wheel without the necessity of reaching behind the wheel.

It is an ancillary object of my invention to provide tire chain linkage whereby all fastening is done on the outside of the wheel while at the same time a force is applied in a direct line between the ends of the inner circumferential runner.

It is another ancillary object of my invention to provide safety hooks which will tend to prevent the chain from coming off if the connecting links across the tread of the tire in a device of this type should break.

In accordance with my invention I provide rings on the ends of the inside circumferential runner. I then insert a long connecting chain through the two rings, extend the ends of the chain across each other, thence out over the tread of the tire and fasten them to different points on the outside circumferential runner. Thus, I provide a direct chain between the two ends of the inner circumferential runner which can be slipped through the rings at the end of the inner runner so that tension can be applied directly between the two rings on the ends of the inner runner. Thus, the inner runner is joined together by a direct pull between the ends of the runner but by means of pull on a remote chain on the outside of the tire so that the operator does not have to reach behind the tire in order to fasten the ends of the inner runner together. By using this system, the connecting chains may be fastened at widely separated spots on the outer chain or runner so that the point where the connecting chain crosses itself is not located on the tread of the tire but instead is located on the inner wall of the tire. With the crossover point located on the inner wall of the tire instead of on the tread of the tire, the chain is not subjected to friction or pounding between the two pieces of ends of the connecting chain at the point of crossover but instead is in a protected position. I have also found with this construction that while bracing chains may be employed on the inside of the tire, nevertheless, for most purposes they are not necessary.

The novel features that I consider characteristic of my invention are set forth with particularity in the appendant claims. The invention itself, however, both as to its organization and its method of operation, together with additional objects and advantages thereof, will best be understood from the following description when read in connection with the accompanying drawing in which:

FIGURE 1 is a showing in elevation of tire and chain, as seen from the inside of the wheel, in accordance with the preferred embodiment of my invention.

FIGURE 2 is a showing in elevation, as seen from the outside of the tire, of a chain and tire in accordance with the preferred embodiment of my invention.

FIGURE 3 is a showing in elevation of a tire and chain, as seen from the inside of the wheel, in accordance with a simpler embodiment of my invention, wherein bracing chains are not employed.

FIGURE 4 is a showing in elevation of a tire and chain, as seen from the inside of the wheel, wherein a crossover chain is employed which crosses the tread only once; and FIGURE 5 is an enlarged view of the chain arrangement shown in FIGURE 1.

In accordance with the preferred embodiment of my invention, I provide a vehicle traction device of the general type commonly referred to as tire chains.

The chains, in accordance with the preferred embodiment of my invention comprise an inner circumferential runner chain 6 which is generally concentric with the axis of the wheel and which lies on the inside of the wheel against the inner side wall of the tire on the wheel. The inner circumferential chain or runner 6 comprises a length of chain which extends in a generally circular manner but which has a discontinuity at one place, which place of discontinuity constitutes the region of connecting so that the chain may be securely attached to the tire. On the outside of the tire lying substantially parallel to the inner circumferential chain, I provide an outer circumferential runner 8 chain which also extends in a circle concentric with the wheel, lies against the outer side wall of the tire on the wheel and which includes a place of discontinuity to allow removal. At periodic intervals I provide the customary cross links 10 extending between the inner and outer runners to provide traction in a manner well known in the art.

On the ends of the inner runner chain 6 which are adjacent the aforementioned discontinuity, I provide rings 12 which are securely fastened to the ends of the runner and which are sufficiently large to allow a chain which is generally of the cross sectional dimensions of the runner chain to slide freely through the rings. I provide a connecting chain 14 as shown in FIGURE 1 which extends through the two rings on the ends of the inner runner so that the center portion of the connecting chain lies in a straight line between the two rings and the remaining portions of the connecting chain, being the long end portions beyond the rings on the inner runner, extend, crossing each other in the region next to the side wall of the tire, thence across the tread of the tire and have their ends connected to widely separated points on the outside runner.

Thus, the connecting chain 14, by means of its center portion extending between the two rings 12 of the inner runner, exerts a force in a direct line between the two rings tending to pull the two rings directly together. The long end portions of the connecting chain which extend beyond the rings, tend to exert a force on the rings which has a vector component radially outward from the axis of the tire and also a vector component directly between the two rings. There are thus three vector component forces being exerted on each ring.

In the organization in accordance with the preferred embodiment of my invention, the three vector forces acting on each ring yield a single vector which is tangential to the curve of the inner runner near the rings. Thus, while the inner runner has its ends fastened together by operation of a remote connection between the connecting chain and the outside runner, nevertheless, the totality of the forces exerted on the rings at the ends of the inner runner is effectively equal to the theoretically perfect vector force.

Theoretically, the perfect force situation would be that where the inner runner is a perfect circle with all forces thereon, except for those exerted by the cross links, are tangental to the circle, and the cross links should theoretically be infinite in number and spaced adjacent each other so that they form a continuous and constant outward pull about the entire length of the circle formed by the inner runner.

On the ends of the connecting chain, I provide hooking or fastening means 16 of types common in the art for fastening the ends of the connecting chain to points on the outer runner.

In the preferred embodiment of my invention, the fastening devices connected to the ends of the connecting chain are sufficiently large in cross section that they will not easily pass through the rings of the inner runner. Therefore, when the chain is being mounted on the tire, the connecting chain extends loosely between the rings on the inner runner and its ends cannot pass through the rings and, therefore, it does not work free from connection with the rings.

The outer runner 8 may be fastened together at its ends after the chain is mounted by means of fastening devices 18 which are already common in the art, since the outer runner is easily accessible to the operator.

In accordance with the embodiment of my invention, as shown in FIGURE 1, the inner runner is provided with a brace chain 20 which extends from one of the rings back along the bight of the inner runner approximately one-fourth of the length of or the distance around the inner runner. The brace chains supply an additional component of vector force directed radially toward the axis so as to offset any undesirable excess of outwardly radially directed vector force which might be produced by the connecting chains if they are fastened to points on the outer runner which are not in accordance with the theoretically perfect situation. Also as shown in FIGURE 1, the brace chains may be employed to cause the rings to be drawn inward toward the axis of the wheel so that the total length of the two brace chains, the section of runner between the brace chains, and the section of connecting chain between the rings, which together effectively now constitute an inner runner, have a length grossly less than the circumference of the wheel. Thus, the brace chains further insure against possibilities of the chain slipping over the tire and becoming free. As shown in FIGURE 1, in accordance with one embodiment of my invention, I provide stoppage means in the form of a short safety chain comprising a safety hook 21 attached by means of a short length of chain 22, preferably two or three links, to a piece of connecting chain which connecting chain extends from the rings on the inner runner across to a point on the outer runner opposite the rings on the inner runner. These safety hooks are attached to the connecting chain while the connecting chain is partially in place. I have found that if these hooks are fastened to the connecting chain near the rings before the connecting chains are drawn tight, they may be connected with reasonable ease and without having to reach behind the tire but instead the rings may be juggled up on top of the tread and the hooks connected easily. If the connecting chain should break in the region where it crosses the tread of the tire, these safety hooks would hold the connecting chain in the region of the rings, thereby maintaining some attachment between the two rings and tending to prevent the chain from coming completely off.

It should be noted that in accordance with one embodiment of my invention, as shown in FIGURE 4, the connecting chain may comprise a single crossover instead of a double crossover. Thus, in accordance with this embodiment, the connecting chain would be fastened at one end to one end of the inner runner, it would extend loosely and slidably through a ring on the other end of the inner runner and then extend across the tire so as to form an acute angle between the portions of the connecting chain on either side of the ring.

It should be noted that in accordance with the broader aspects of my invention, the connecting chain herein described could comprise a cable of flexible steel wire or of a strong nylon cord or similar material. Such a material would be easier to identify in the hands of a novice and would aid in orientation as the chain is being handled and the ends on the outside could be attached to the outer runner at different points each time the chain is used so that the portion lying above the tread of the tire, and therefore, the portion of greatest wear, could be chained so as to extend its life sufficiently that it would not be impractical.

I have thus described a traction chain and coupling units connected therewith whereby the chain may be installed on the tire without the necessity of the operator reaching behind the tire while at the same time providing a connection between the ends of the inner runner which results in tightening and holding vector forces which are, effectively, substantially tangential to the wheel.

I claim as my invention:

1. A traction device for a wheeled vehicle comprising, a pair of circumferential support chains that lie generally concentric with said wheel along the inside and outside side walls of said wheel respectively when in place, cross links comprising shorter links of chain that lie across the tread of said wheel interconnecting the circumferential support chains at periodic intervals, the inner circumferential support chain being discontinuous and having a ring attached at each of its ends, a reinforcing link of chain extending from each of said rings as a chord to their respective portions of said inner circumferential chain and being fastened to said inner circumferential chain at points on the bight of said inner circumferential chain distant from said rings, a connecting chain being fastened at its ends to spaced points on the outer circumferential chain and extending across the tread of said wheel at an angle, through one of said rings in a loose manner and through the other of said rings in a loose manner so that said connecting chain crosses itself near said rings, said connecting chain having stoppage means connected to said connecting chain near where said connecting chain passes through said rings, capable of preventing the separable ends of said connecting chain from passing through said rings when said connecting chain is separated in its region which crosses the tread of said tire.

2. A traction device as claimed in claim 1 wherein said connecting chain comprises a smooth cable section in the bight thereof and chain links approximately one-third of its length adjacent each of the ends thereof.

3. A traction device for a wheel comprising, a pair of circumferential support chains that lie generally concentric with said wheel along the inside and outside side walls of said wheel respectively when in place, cross links comprising shorter links of chain that lie across the tread of said wheel interconnecting the circumferential support chains at periodic intervals, the inner circumferential support chain being separably discontinuous and having a ring attached at each of its ends, a reinforcing link of chain extending from each of said rings as a chord to said inner circumferential chain and being fastened to said inner circumferential chain at points on the respective portions of the bight of said inner circumferential chain distant from said rings, a connecting chain being separably fastened at its outer ends to respective portions of the outer circumferential chain and extending through one of said rings in a loose manner and across and through the other of said rings in a slidable manner and then crossing between said rings and said tread.

4. A traction device for a wheel comprising a pair of circumferential support chains constructed to lie generally concentric with said wheel along the inside and outside side walls of said wheel when in place, said support chains being discontinuous at one portion of the circumference of said wheel, and rings attached to the inner one of said support chains at either side of the discontinuity thereof, a connecting chain connected to one of said rings, through the other of said rings and extending, at an acute angle to a line between said rings, across the tread of said wheel to a connection with the outer circumferential support chain, and a short safety chain connected between the bight of said circumferential chain and a point on said connecting chain between one of said rings and an end of said connecting chain.

5. A traction device for a wheel comprising, a pair of circumferential support chains that lie generally concentric with said wheel along the inside and outside side walls of said wheel respectively when in place, cross links comprising shorter links of chain that lie across the tread of said wheel interconnecting the circumferential support chains at periodic intervals, the circumferential support chains being separated at one place along their lengths, the inner circumferential chain having a ring attached at each of its ends, a reinforcing length of chain extending from each of said rings and being fastened to said inner circumferential chain at points on the bight of said inner circumferential chain distant from said rings so as to draw the ends of said inner circumferential chain back toward the bight, a connecting chain being fastened at its ends to the respective ends of the outer circumferential chain and extending across the tread of said wheel at an angle, through one of said rings in a loose manner and connectingly across and through the other of said rings in a loose manner so that said connecting chain crosses itself between said rings and the tread of said wheel.

6. A traction device for a wheel comprising an inner circumferential support chain and an outer circumferential support chain which support chains lie generally concentric with said wheel along the said walls of said wheel, cross links comprising shorter lengths of a chain that lie across the said wheel interconnecting the circumferential support chains at periodic intervals, the inner circumferential support chain being discontinuous and having a ring attached at each of its ends, a reinforcing member extending from each of said rings as a chord to their respective adjacent portions of said inner circumferential chain and being fastened to said inner circumferential chain at points on the bight of said inner circumferential chain distant from said rings, a connecting chain being fastened at its ends to spaced points on the outer circumferential chain and extending across the tread of said wheel at an angle and through said rings in a slidable manner, and means attached to said connecting chain near where said connecting chain passes through said rings for preventing cross portions of said connecting chain from passing more than a predetermined distance through said rings in the event of severance of said connecting chain in the region of said tread section.

7. A traction device for a wheel comprising a pair of circumferential inner and outer support chains constructed to lie generally concentric with said wheel along the inside and outside side walls of said wheel when in place, at least said inner support chain being substantially separably discontinuous at one portion of the circumference of said wheel, rings attached to the inner of said support chains at either side of the discontinuity thereof, and a flexible connecting member slidably passing through said rings and having outer portions adapted to extend outwardly across the tread of said wheel to respective connections with the circumferential outer support chain, said last-named respective connections being spaced wider apart than the distance between said rings to provide crossing of said outer portions between said rings and said tread.

References Cited by the Examiner
UNITED STATES PATENTS

| | | | |
|---|---|---|---|
| 1,299,082 | 4/19 | Willson | 152—241 X |
| 1,672,019 | 6/28 | Barber | 152—213 |
| 1,935,035 | 11/33 | Levi | 152—213 |
| 2,512,646 | 6/50 | Herbrick | 152—213 |
| 2,562,798 | 7/57 | Kovatch et al. | 152—213 |
| 3,042,097 | 7/62 | Skrip | 152—239 |

ARTHUR L. LA POINT, *Primary Examiner.*